(12) United States Patent
Liu et al.

(10) Patent No.: US 8,553,406 B2
(45) Date of Patent: Oct. 8, 2013

(54) FIXING MECHANISM FOR FIXING A DETACHABLE MODULE AND RELATED ELECTRONIC DEVICE

(75) Inventors: Chia-Hsin Liu, New Taipei (TW); Ming-Hui Kao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 357 days.

(21) Appl. No.: 13/117,155

(22) Filed: May 27, 2011

(65) Prior Publication Data
US 2012/0162868 A1 Jun. 28, 2012

(30) Foreign Application Priority Data

Dec. 24, 2010 (TW) ................................ 99145751 A

(51) Int. Cl.
*G06F 1/16* (2006.01)
(52) U.S. Cl.
USPC ............ 361/679.39; 361/679.33; 361/679.37; 312/223.1; 312/223.2; 360/99.14
(58) Field of Classification Search
USPC ........................ 361/679.39; 360/97.01, 99.14
See application file for complete search history.

(56) References Cited

U.S. PATENT DOCUMENTS

| | | | | |
|---|---|---|---|---|
| 7,679,896 B2* | 3/2010 | Deng et al. | ............... | 361/679.33 |
| 7,787,244 B1* | 8/2010 | Liu | ........................... | 361/679.33 |
| 2006/0139871 A1* | 6/2006 | Chen et al. | ................... | 361/685 |
| 2006/0187632 A1* | 8/2006 | Chen et al. | ................... | 361/685 |

* cited by examiner

*Primary Examiner* — Anthony Q Edwards
(74) *Attorney, Agent, or Firm* — Winston Hsu; Scott Margo

(57) ABSTRACT

A fixing mechanism for fixing a detachable module is disclosed. The fixing mechanism includes a cage having a first bent portion, and a sliding base installed inside the cage in a slidable manner for supporting the detachable module. The sliding base includes a rack, and at least one first resilient hook for engaging with the first bent portion when the sliding base is installed inside the cage so as to prevent the sliding base from separating from the cage in a first direction. The fixing mechanism further includes at least one spring module installed on the cage and engaged with the rack on the sliding base for driving the rack so as to slide the sliding base relative to the cage. The fixing mechanism further includes a latch module installed on the sliding base for latching the detachable module when the detachable module is installed inside the sliding base.

16 Claims, 6 Drawing Sheets

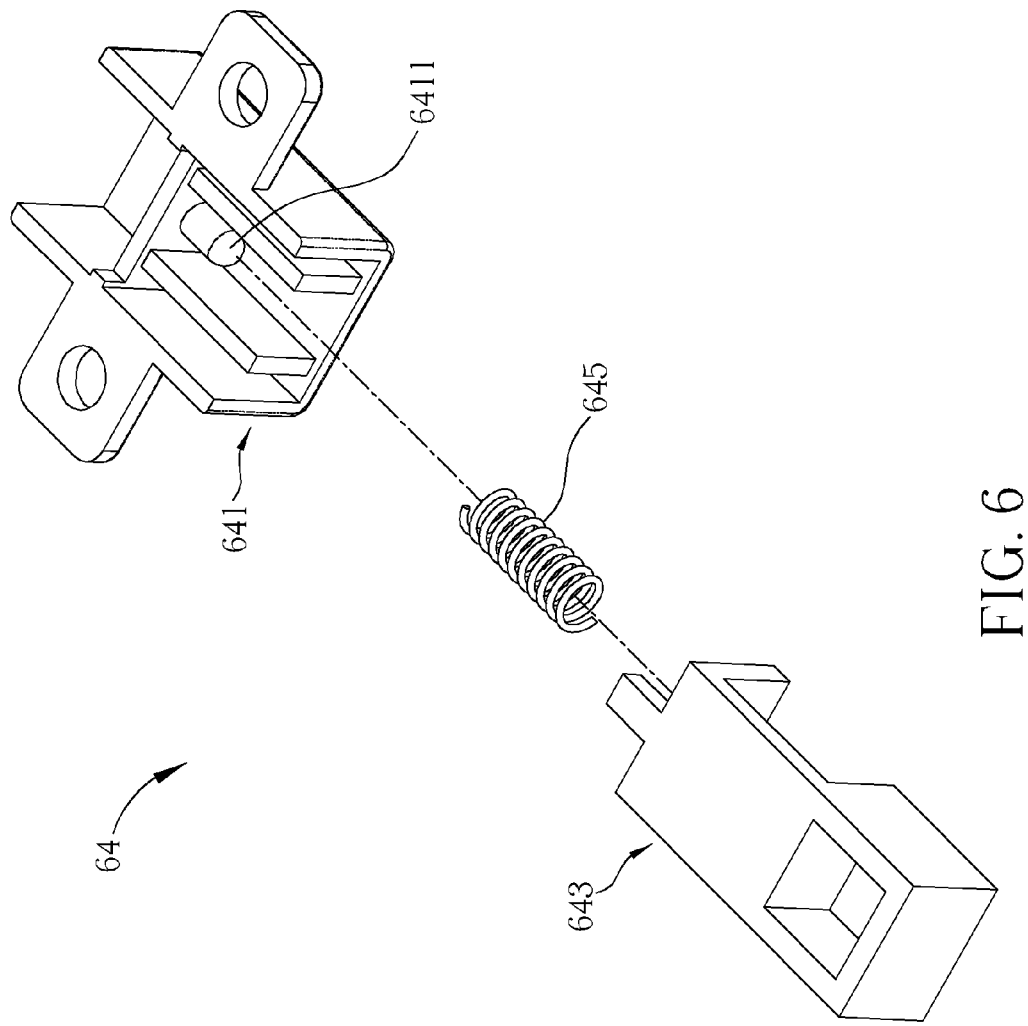

FIXING MECHANISM FOR FIXING A DETACHABLE MODULE AND RELATED ELECTRONIC DEVICE

BACKGROUND OF THE INVENTION

1. Field of the Invention

The present invention relates to a fixing mechanism for a detachable module and a related electronic device, and more particularly, to a fixing mechanism for a detachable module without using screws and the related electronic device.

2. Description of the Prior Art

People have to take apart computers when replacing broken components or upgrading instruments inside the computer. So computers capable of being disassembled easily are necessary. It is also inconvenient for users to disassemble a storage device such as a hard disk from a computer.

For example, please refer to FIG. 1. FIG. 1 is a diagram of a computer device 10 in the prior art. The computer device 10 includes a housing 11 similar to a rectangular shape, a power supply 12 disposed on a rear-right side inside the housing 11, an optical disk drive fixture 13 disposed on a front-right side inside the housing 11, and a hard disk drive fixture 14 disposed under the optical disk drive fixture 13 inside the housing 11. A plurality of fixing holes 15 is formed on both right and left sides of the hard disk drive fixture 14. A hard disk drive 16 with a plurality of tapped holes 17 formed on both right and left sides can be placed inside the housing from the front, rear, or top sides of the housing 11, and the hard disk drive 16 can be fixed on the hard disk drive fixture 14 by screwing the tapped holes 17 and the fixing holes 15.

Before user disassemble the hard disk drive 16 from the computer device 10, they have to disassemble an optical disk drive first and then loose screws on both the left and right sides of the hard disk drive fixture 14. It is hard to disassemble the hard disk drive 16 due to the limited internal space of the computer device 10. Some hard disks are placed inside the housing 11 from the rear side of the housing 11, so that the power supply 12 has to be disassembled before disassembling the hard drive 16. Disassembling the power supply 12 is even more difficult than disassembling the optical disk drive. No matter where the hard disk drive 16 is placed inside the housing 11, it is difficult to screw the hard disk drive 16 in the limited internal space inside the housing 11.

For solving above drawbacks, there have been various detachable modules in the market. For example, a detachable module for easy disassembly is disclosed in TW Patent No. 1259449 for enhancing assembly efficiency of storage devices installed inside the computer device, and for reducing difficulty of replacing the storage devices. However, the above-mentioned detachable module still needs fixing parts such as screws to connect each component of the detachable module, so as to increase complexity and inconvenience of the assembly.

SUMMARY OF THE INVENTION

The present invention provides a latch mechanism and a related portable computer for solving above drawbacks.

According to the claimed invention, a fixing mechanism includes a cage including a first bent portion, a sliding base installed inside the cage in a slidable manner for supporting a detachable module, at least one spring module installed on the cage and engaged with the rack on the sliding base for driving the rack so as to slide the sliding base relative to the cage, and a latch module installed on the sliding base for latching the detachable module when the detachable module is installed inside the sliding base, wherein the sliding base comprising a rack, and at least one first resilient hook for engaging with the first bent portion when the sliding base is installed inside the cage so as to prevent the sliding base from separating from the cage in a first direction.

According to the claimed invention, the spring module includes a gear engaged with the rack on the sliding base and a winding spring installed on the gear for driving the winding spring to rotate.

According to the claimed invention, the spring module further includes a base connected to the cage for supporting the gear and a rotating button covering the winding spring, wherein the rotating button includes a positioning post connected to an end of the winding spring for driving the winding spring to rotate.

According to the claimed invention, the latch module includes a latch component pivotally connected to the sliding base and including a pin and a resilient component connected to the latch component for driving the latch component to an initial position when the latch component is not pushed by the protruding portion of the cage, wherein the latch component is pushed by a protruding portion of the cage when the sliding base slides into the cage, so that the pin is inserted into a hole on the detachable module so as to fix the detachable module inside the sliding base.

According to the claimed invention, the fixing mechanism further includes a key module installed on the cage. The key module includes a housing, a pushing component installed inside the housing in a movable manner, and a resilient component installed inside the housing for driving the pushing component to an initial position when the pushing component is not pushed. An end of the pushing component is disposed through the first bent portion for driving the first resilient hook to separate from the first bent portion.

According to the claimed invention, the sliding base further includes a second resilient hook protruding from a side of the cage for preventing the sliding base from separating from the cage in a direction opposite to the first direction.

According to the claimed invention, the cage further includes a second bent portion for stopping an end of the sliding base so as to prevent the sliding base from separating from the cage in a direction opposite to the first direction.

According to the claimed invention, the cage further includes at least one buffer component for contacting a circuit board installed on a side of the cage.

According to the claimed invention, an electronic device includes a detachable module whereon a hole is disposed and a fixing mechanism for fixing the detachable module. The fixing mechanism includes a cage including a first bent portion, a sliding base installed inside the cage in a slidable manner for supporting a detachable module, at least one spring module installed on the cage and engaged with the rack on the sliding base for driving the rack so as to slide the sliding base relative to the cage, and a latch module installed on the sliding base for latching the detachable module when the detachable module is installed inside the sliding base, wherein the sliding base comprising a rack, and at least one first resilient hook for engaging with the first bent portion when the sliding base is installed inside the cage so as to prevent the sliding base from separating from the cage in a first direction.

These and other objectives of the present invention will no doubt become obvious to those of ordinary skill in the art after reading the following detailed description of the embodiment that is illustrated in the various figures and drawings.

BRIEF DESCRIPTION OF THE DRAWINGS

FIG. 6 is an exploded diagram of a key module of the electronic device.

DETAILED DESCRIPTION

Figure 1:
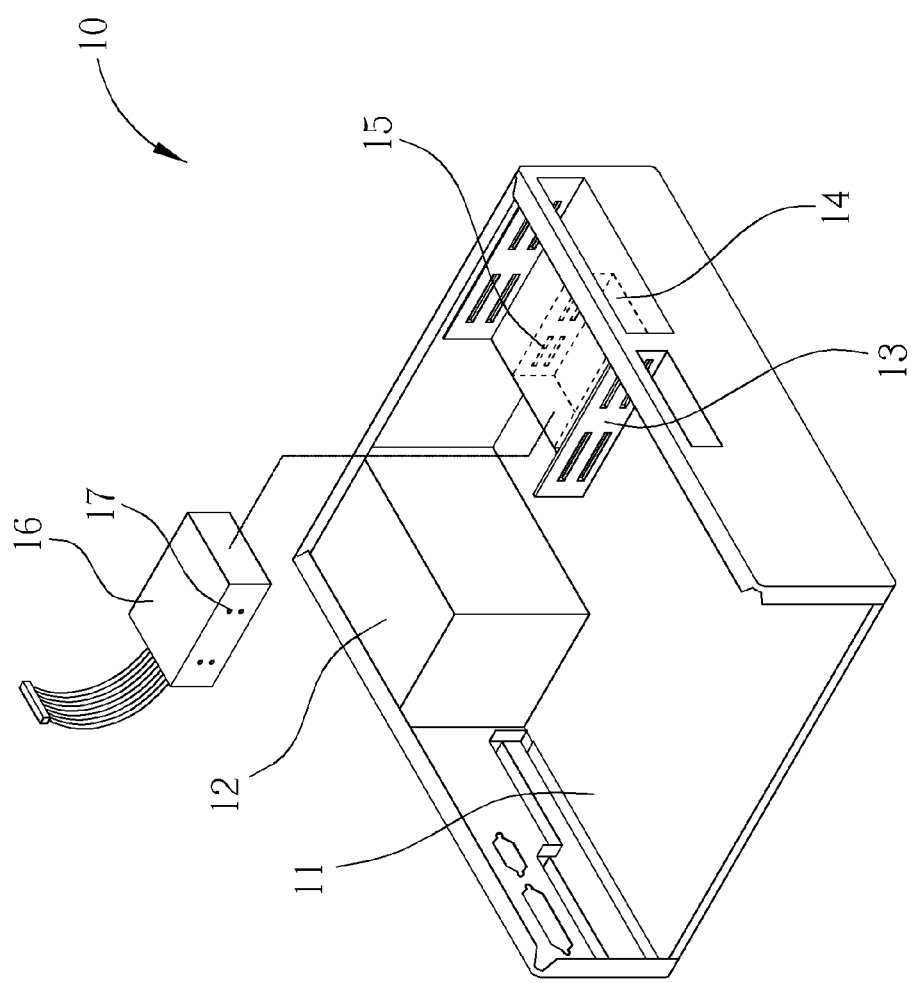
FIG. 1 is a diagram of a computer device in the prior art.
Figure 2:
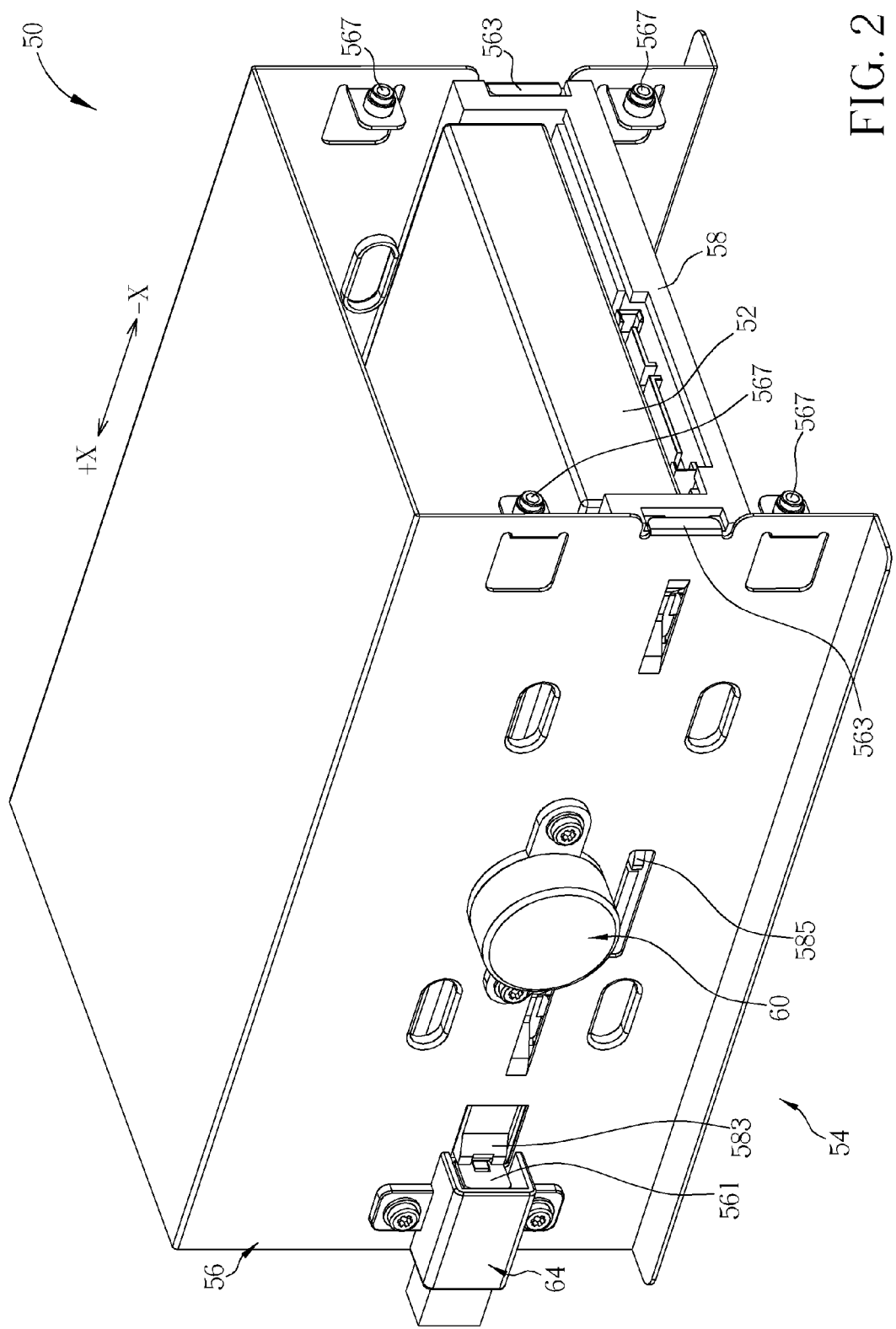
FIG. 2 is an assembly diagram of an electronic device according to an embodiment of the present invention.
Figure 3:
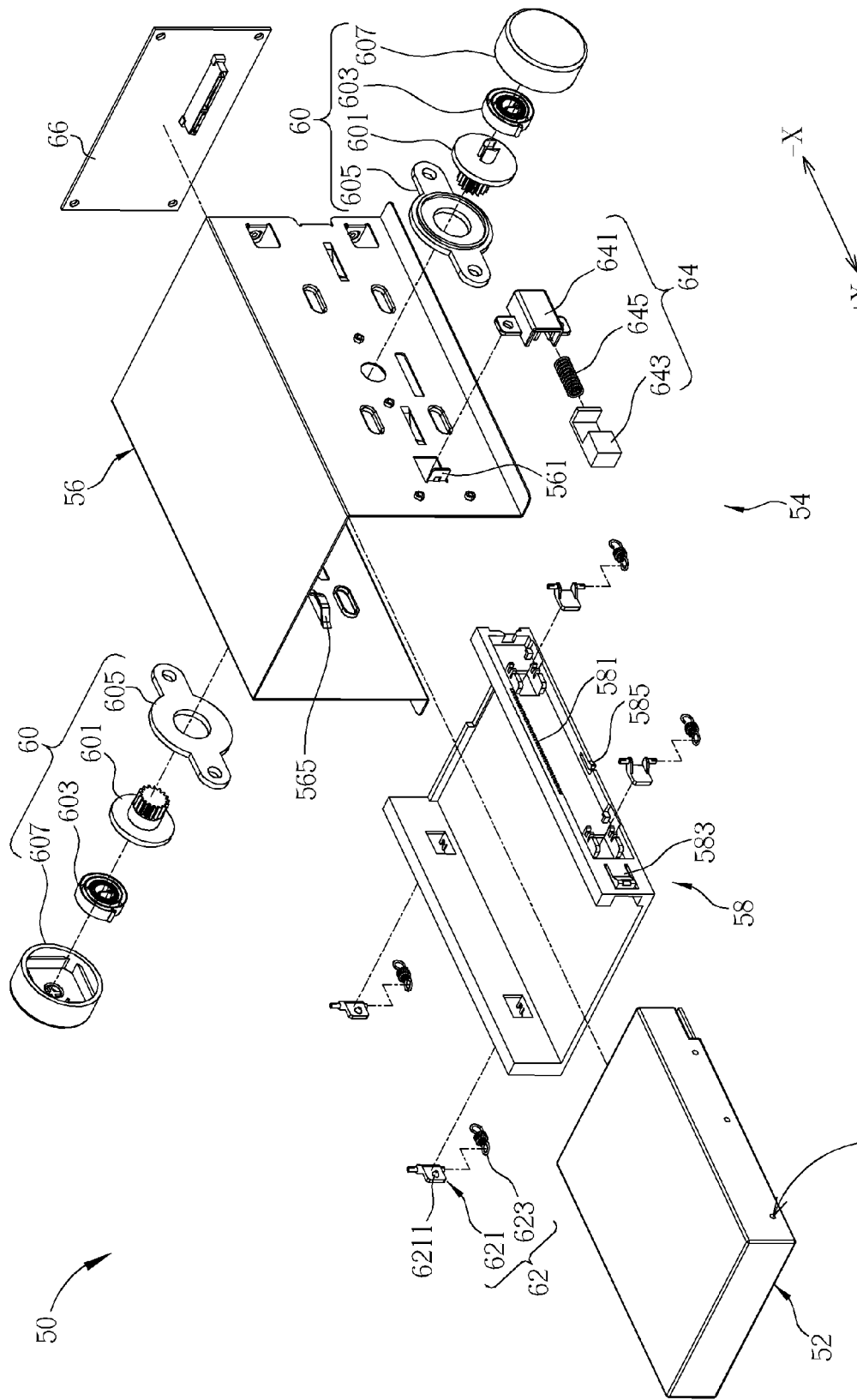
FIG. 3 is an exploded diagram of the electronic device in FIG. 2.

Please refer to FIG. 2 and FIG. 3. FIG. 2 is an assembly diagram of an electronic device 50 according to an embodiment of the present invention, and FIG. 3 is an exploded diagram of the electronic device 50 in FIG. 2. The electronic device 50 can be a computer device and includes a detachable module 52 whereon a hole 521 is disposed. The detachable module 52 can be a detachable storage module, such as a hard disk drive and so on. The electronic device 50 further includes a fixing mechanism 54 for fixing the detachable module 52. The fixing mechanism 54 includes a cage 56 capable of being fixed on an internal housing of the electronic device 50. A cage 56 includes a first bent portion 561 and at least one second bent portion 563. The fixing mechanism 54 further includes a sliding base 58 installed inside the cage 56 in a slidable manner for supporting the detachable module 52, so as to contain the detachable module 52 inside the electronic device 50 or to pull the detachable module 52 out of the electronic device 50. The sliding base 58 includes a rack 581, at least one first resilient hook 583, and at least one second resilient hook 585. The first resilient hook 583 is pushed by the cage 56 and is resiliently deformed when the sliding base 58 has not been completely contained inside the cage 56 due to resilience of the first resilient hook 583. When the sliding base 58 is completely contained inside the cage 56, the first resilient hook 583 can recover resiliently to protrude out of a corresponding opening of the cage 56, so as to engage with the first bent portion 561 of the cage 56, for preventing the sliding base 58 from separating from the cage 56 in a first direction (+X direction). The sliding base 58 can includes two second resilient hooks 585 respectively disposed on both sides of the sliding base 58 and protrudes from one side of the cage 56, for preventing the sliding base 58 from separating from the cage 56 in a direction (−X direction) opposite to the first direction. In addition, the second bent portion 563 of the cage 56 can be used for stopping an end of the sliding base 58 as well, so as to prevent the sliding base 58 from separating from the cage 56 in the direction opposite to the first direction (−X direction).

Figure 4:
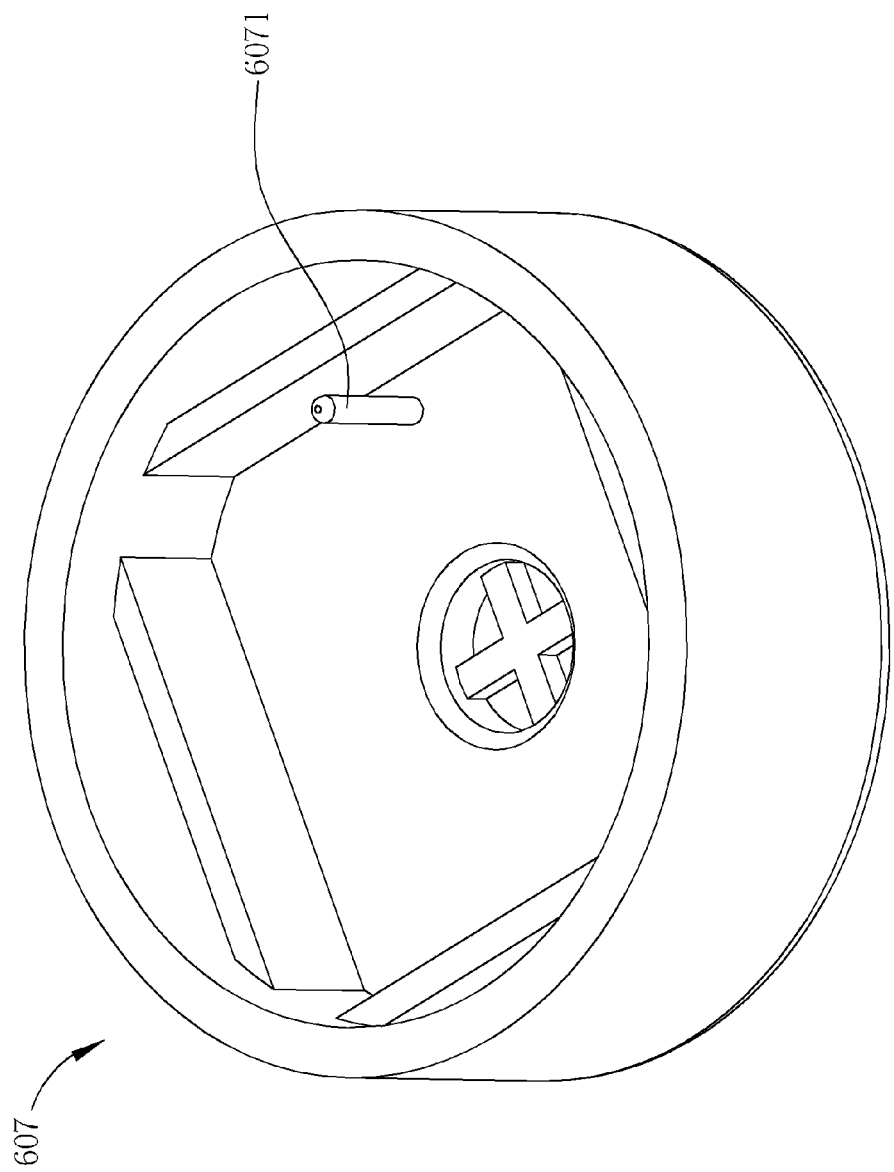
FIG. 4 is a diagram of a rotating button of a spring module of the electronic device in FIG. 2.

The fixing mechanism 54 further includes at least one spring module 60 installed on the cage 56 and engaged with the rack 581 of the sliding base 58 for driving the rack 581 so as to slide the sliding base 58 relative to the cage 56. Accordingly, the detachable module 52 can be contained inside the electronic device 50 or be pulled out of the electronic device 50. In this embodiment, the fixing mechanism 54 includes two spring modules 60 installed on both sides of the cage 56. However, the amount and disposal of the spring modules 60 are not limited to those mentioned in this embodiment, and it depends on practical demands. The spring module 60 includes a gear 601, a winding spring 603, a base 605 and a rotating button 607. The gear 601 passes through the base 605 and the cage 56 to be engaged with rack 581 on the sliding base 58. The winding spring 603 is installed on the gear 601 for driving the gear 601 to rotate, so that the gear 601 drives the rack 581 of the sliding base 58. The base 605 is connected to the cage 56 for supporting the gear 601, and the rotating button 607 covers the winding spring 603. Please refer to FIG. 4. FIG. 4 is a diagram of the rotating button 607 of the spring module 60 of the electronic device 50 in FIG. 2. The rotating button 607 includes a positioning post 6071 connected to an end of the winding spring 603. A user can rotate the rotating button 607 for driving the winding spring 603 to rotate the gear 601. Accordingly, the gear 601 drives the rack 581 of the sliding base 58 to move, so as to drive the sliding base 58 to slide relative to the cage 56.

Figure 5:
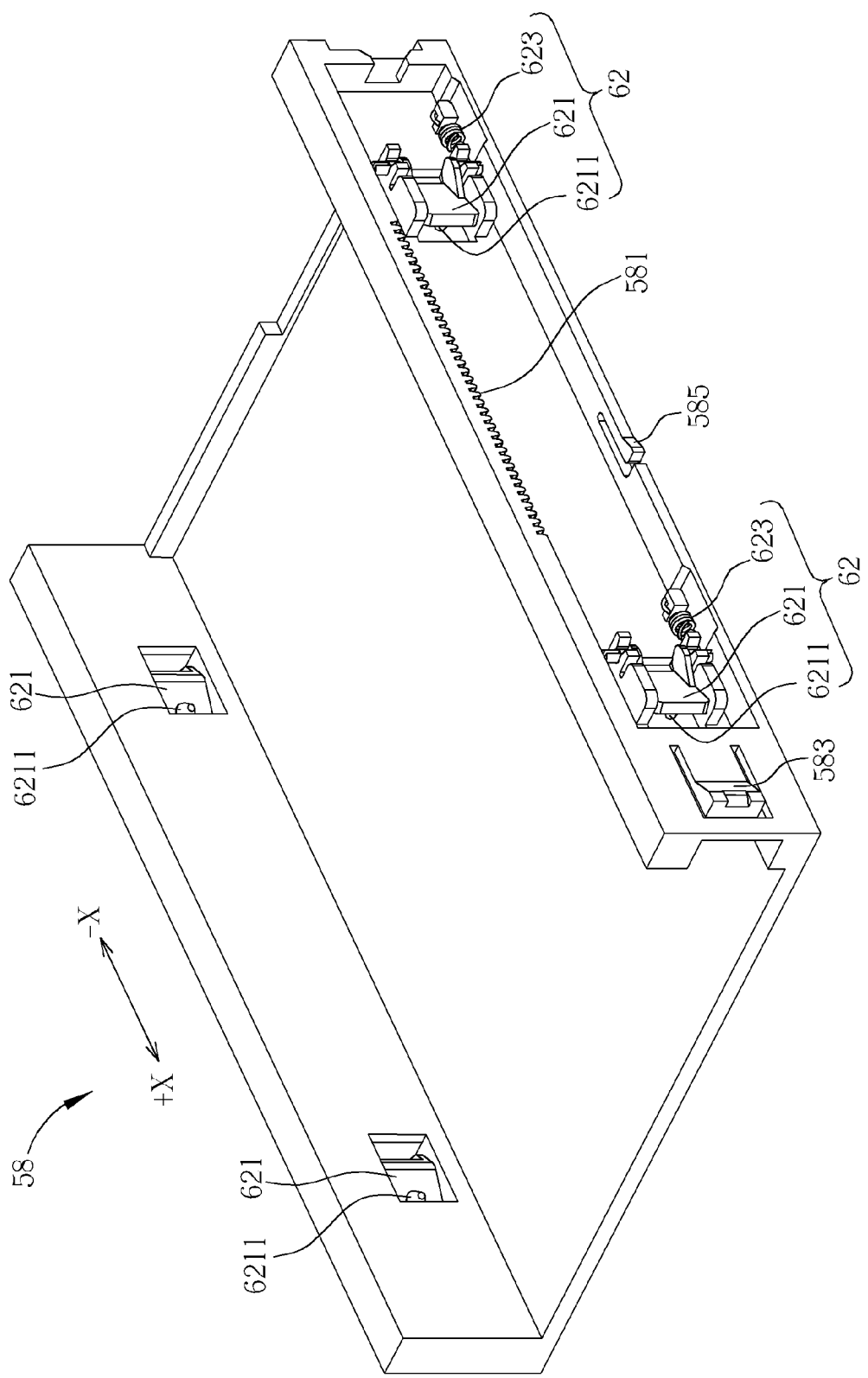
FIG. 5 is a diagram of a sliding base of the electronic device in FIG. 2.

Please refer to FIG. 3 and FIG. 5. FIG. 5 is a diagram of the sliding base 58 of the electronic device 50 in FIG. 2. The fixing mechanism 54 further includes at least one latch module 62 installed on the sliding base 58 for latching the detachable module 52 when the detachable module 52 is installed inside the sliding base 58. There can be four latch modules 62 installed on both sides of the sliding base 58 in the fixing mechanism 54. However, the number and disposal of the latch module 62 are not limited to those mentioned in this embodiment, and it depends on practical demands. At least one protruding portion 565 is formed on an inner side of the cage 56. When the sliding base 58 is installed inside the cage 56, each of the protruding portion 565 is located at a position corresponding to the latch module 62. The latch module 62 includes a latch component 621 pivotally connected to the sliding base 58, and the latch component 621 includes a pin 6211 on a side. The latch component 621 is pushed by the corresponding protruding portion 565 when the sliding base 58 slides into the cage 56, so that the pin 6211 is inserted into the corresponding hole 521 on the detachable module 52 so as to fix the detachable module 52 inside sliding base 58. In other words, when the sliding base 58 is installed inside the cage 56, the latch component 621 of the latch module 62 can automatically latch the detachable module 52 inside the sliding base 58, so as to fix the detachable module 52 inside the cage 56. The latch module 62 further includes a resilient component 623 connected to the latch component 621, and the resilient component 623 can be a spring. The resilient component 623 drives the latch component 621 to recover back to an initial position when the latch component 621 is not pushed by the protruding portion 565 of the cage 56, that is, when the sliding base 58 does not completely slide into the cage 56. At the same time, the pin 6211 has not been inserted into the corresponding hole 521 of the detachable module 52, that is, the latch module 62 does not latch the detachable module 52. Accordingly, the detachable module 52 and the sliding base 58 can be pulled out of the cage 56.

In addition, the fixing mechanism 54 further includes a key module 64 installed on the cage 56 for releasing the engagement between the first resilient hook 583 and the first bent portion 561 of the cage 56. Please refer to FIG. 2, FIG. 3 and FIG. 6. FIG. 6 is an exploded diagram of the key module 64 of the electronic device 50. The key module 64 includes a housing 641 whereon a positioning post 6411 is formed. The key module 64 further includes a pushing component 643 installed inside the housing 641 in a movable manner. An end of the pushing component 643 is disposed through the first bent portion 561 of the cage 56 for driving the first resilient hook 583 of the sliding base 58 to move inwardly, so that the first resilient hook 583 separates from the first bent portion 561. Accordingly, the engagement between the first resilient hook 583 and the first bent portion 561 is released, so as to eject the sliding base 58 and the detachable module 52 out of the cage 56. The key module 64 further includes a resilient component 645 installed inside the housing 641, and an end of the resilient component 645 sheathes the positioning post 6411. The resilient component 645 can be a spring, and the resilient component 645 is used for driving the pushing component 643 to recover back to an initial position when the pushing component 643 is not pushed. In other words, the resilient component 645 can recover the pushing component 643 to the initial position for the sake of convenience of next operation when the pushing component 643 is no longer pushed.

In summary, when the detachable module 52 is to be assembled inside the cage 56, the detachable module 52 is disposed inside the sliding base 58 first, and then the assembly of the detachable module 52 and the sliding base 58 is placed inside the cage 56. At the same time, the user can rotate the rotating button 607 of the spring module 60 for driving the winding spring 603. Accordingly, the winding spring 603 can drive the gear 601 to rotate, so that the gear 601 drives the rack 581 of the sliding base 58 to move, so as to drive the sliding base 58 to slide relative to the cage 56 in the direction opposite to the first direction (−X direction). When the sliding base 58 is completely contained in the cage 56, the latch component 621 of the latch module 62 can be pushed by the protruding portion 565 of the cage 56 to automatically latch the detachable module 52 in the sliding base 58, so as to fix the detachable module 52 inside the cage 56. Furthermore, the first resilient hook 583 can recover resiliently to protrude out of the corresponding opening of the cage 56, so as to engage with the first bent portion 561 of the cage 56, for preventing the sliding base 58 from separating from the cage 56 in the first direction (+X direction). At the same time, the second resilient hook 585 protrudes from the one side of the cage 56, for preventing the sliding base 58 from separating from the cage 56 in the direction opposite to the first direction (−X direction), and the second bent portion 563 of the cage 56 stops at the end of the sliding base 58, for preventing the sliding base 58 from separating from the cage 56 in the direction opposite to the first direction (−X direction). Accordingly, the detachable module 52 and the sliding base 58 can be stably fixed inside the cage 56. In addition, the cage 56 includes at least one buffer component 567 for contacting a circuit board 66 installed on an end of the cage 56. The circuit board 66 is electrically connected to the detachable module 52, so as to transmit electrical signals with the detachable module 52. The buffer component 567 can absorb vibration between the circuit board 66 and cage 56 when assembling the circuit board 66, for preventing the circuit board from damage. In addition, when the detachable module 52 is disassembled from the cage 56, the pushing component 643 of the key module 64 can be pushed to drive the first resilient hook 583 of the sliding base 58 to move inwardly. Accordingly, the first resilient hook 583 is separated from the first bent portion 561, so as to release the engagement between the first resilient hook 583 and the first bent portion 561. At the same time, the winding spring 603 of the spring module 60 drives the gear 601 to rotate reversely, so that the gear 601 drives the rack 581 of the sliding base 58 to move so as to drive the sliding base 58 to slide relative to the cage 56 in the first direction (+X direction). In such a manner, the sliding base 58 and the detachable module 52 can be ejected out of the cage 56.

Compared with the prior art, the fixing mechanism for fixing the detachable module of the present invention can improve assembly of the conventional detachable module and the computer device. Furthermore, no screws are needed to connect each component of the detachable module, so as to reduce complexity and inconvenience of the assembly process.

Those skilled in the art will readily observe that numerous modifications and alterations of the device and method may be made while retaining the teachings of the invention.

What is claimed is:

1. A fixing mechanism comprising:
   a cage comprising a first bent portion;
   a sliding base installed inside the cage in a slidable manner for supporting a detachable module, the sliding base comprising a rack, and at least one first resilient hook for engaging with the first bent portion when the sliding base is installed inside the cage so as to prevent the sliding base from separating from the cage in a first direction;
   at least one spring module installed on the cage and engaged with the rack on the sliding base for driving the rack so as to slide the sliding base relative to the cage; and
   a latch module installed on the sliding base for latching the detachable module when the detachable module is installed inside the sliding base.

2. The fixing mechanism of claim 1, wherein the spring module comprises:
   a gear engaged with the rack on the sliding base; and
   a winding spring installed on the gear for driving the winding spring to rotate.

3. The fixing mechanism of claim 2, wherein the spring module further comprises:
   a base connected to the cage for supporting the gear; and
   a rotating button covering the winding spring, the rotating button comprising a positioning post connected to an end of the winding spring for driving the winding spring to rotate.

4. The fixing mechanism of claim 1, wherein the latch module comprises:
   a latch component pivotally connected to the sliding base and comprising a pin, the latch component being pushed by a protruding portion of the cage when the sliding base slides into the cage, so that the pin is inserted into a hole on the detachable module so as to fix the detachable module inside the sliding base; and
   a resilient component connected to the latch component for driving the latch component to an initial position when the latch component is not pushed by the protruding portion of the cage.

5. The fixing mechanism of claim 1, further comprising a key module installed on the cage, the key module comprising:
   a housing;
   a pushing component installed inside the housing in a movable manner, an end of the pushing component being disposed through the first bent portion for driving the first resilient hook to separate from the first bent portion; and
   a resilient component installed inside the housing for driving the pushing component to an initial position when the pushing component is not pushed.

6. The fixing mechanism of claim 1, wherein the sliding base further comprises a second resilient hook protruding from a side of the cage for preventing the sliding base from separating from the cage in a direction opposite to the first direction.

7. The fixing mechanism of claim 1, wherein the cage further comprises a second bent portion for stopping an end of the sliding base so as to prevent the sliding base from separating from the cage in a direction opposite to the first direction.

8. The fixing mechanism of claim 1, wherein the cage further comprises at least one buffer component for contacting a circuit board installed on a side of the cage.

9. An electronic device comprising:
   a detachable module whereon a hole is disposed; and
   a fixing mechanism for fixing the detachable module, the fixing mechanism comprising:
      a cage comprising a first bent portion;
      a sliding base installed inside the cage in a slidable manner for supporting the detachable module, the sliding base comprising a rack, and at least one first resilient hook for engaging with the first bent portion when the sliding base is installed inside the cage so as to prevent the sliding base from separating from the cage in a first direction;
      at least one spring module installed on the cage and engaged with the rack on the sliding base for driving the rack so as to slide the sliding base relative to the cage; and
      a latch module installed on the sliding base for latching the detachable module when the detachable module is installed inside the sliding base.

10. The electronic device of claim 9, wherein the spring module comprises:
   a gear engaged with the rack on the sliding base; and
   a winding spring installed on the gear for driving the gear to rotate.

11. The electronic device of claim 10, wherein the spring module further comprises:
   a base connected to the cage for supporting the gear; and
   a rotating button covering the spring module, the rotating button comprising a positioning post connected to an end of the winding spring for driving the winding spring to rotate.

12. The electronic device of claim 9, wherein the latch module comprises:
   a latch component pivotally connected to the sliding base and comprising a pin, the latch component being pushed by a protruding portion of the cage when the sliding base slides into the cage, so that the pin is inserted into a hole on the detachable module so as to fix the detachable module inside the sliding base; and
   a resilient component connected to the latch component for driving the latch component to an initial position when the latch component is not pushed by the protruding portion of the cage.

13. The electronic device of claim 9, further comprising a key module installed on the cage, the key module comprising:
   a housing;
   a pushing component installed inside the housing in a movable manner, an end of the pushing component being disposed through the first bent portion for driving the first resilient hook to separate from the first bent portion; and
   an resilient component installed inside the housing for driving the pushing component to an initial position when the pushing component is not pushed.

14. The electronic device of claim 9, wherein the sliding base further comprises a second resilient hook protruding from a side of the cage for preventing the sliding base from separating from the cage in a direction opposite to the first direction.

15. The electronic device of claim 9, wherein the cage further comprises a second bent portion for stopping an end of the sliding base so as to prevent the sliding base from separating from the cage in a direction opposite to the first direction.

16. The electronic device of claim 9, wherein the cage further comprises at least one buffer component for contacting a circuit board installed on a side of the cage.

* * * * *